(12) United States Patent
Xu et al.

(10) Patent No.: US 12,497,504 B2
(45) Date of Patent: Dec. 16, 2025

(54) BUILD MATERIALS FOR 3D PRINTING

(71) Applicant: 3D Systems, Inc., Rock Hill, SC (US)

(72) Inventors: Pingyong Xu, Valencia, CA (US); John Fong, Temple City, CA (US); John Stockwell, Sylmar, CA (US)

(73) Assignee: 3D Systems, Inc., Rock Hill, SC (US)

( * ) Notice: Subject to any disclaimer, the term of this patent is extended or adjusted under 35 U.S.C. 154(b) by 155 days.

(21) Appl. No.: 18/335,349

(22) Filed: Jun. 15, 2023

(65) Prior Publication Data
US 2023/0331974 A1 Oct. 19, 2023

Related U.S. Application Data

(63) Continuation of application No. 16/925,975, filed on Jul. 10, 2020, now Pat. No. 11,718,743.

(60) Provisional application No. 62/873,486, filed on Jul. 12, 2019.

(51) Int. Cl.
| | |
|---|---|
| *B29C 71/04* | (2006.01) |
| *B29C 64/124* | (2017.01) |
| *B29C 64/129* | (2017.01) |
| *B33Y 10/00* | (2015.01) |
| *B33Y 40/20* | (2020.01) |
| *B33Y 70/00* | (2020.01) |
| *C08F 2/46* | (2006.01) |
| *C08F 2/48* | (2006.01) |
| *C08F 220/18* | (2006.01) |
| *C08F 226/06* | (2006.01) |
| *C08F 283/00* | (2006.01) |
| *C08G 73/06* | (2006.01) |
| *C08L 33/08* | (2006.01) |
| *C08L 33/10* | (2006.01) |
| *C08L 33/12* | (2006.01) |
| *C08L 75/04* | (2006.01) |
| *C09D 11/101* | (2014.01) |
| *C09D 11/102* | (2014.01) |
| *C09D 11/107* | (2014.01) |
| *B29K 33/00* | (2006.01) |
| *B29K 75/00* | (2006.01) |
| *B29K 79/00* | (2006.01) |
| *B29K 96/04* | (2006.01) |
| *B29K 105/00* | (2006.01) |
| *B29K 105/24* | (2006.01) |

(52) U.S. Cl.
CPC ............ *C08L 33/08* (2013.01); *B29C 64/124* (2017.08); *B29C 64/129* (2017.08); *B33Y 10/00* (2014.12); *B33Y 70/00* (2014.12); *C08F 283/006* (2013.01); *C08G 73/0616* (2013.01); *C08L 75/04* (2013.01); *C09D 11/101* (2013.01); *C09D 11/102* (2013.01); *C09D 11/107* (2013.01); *B29K 2033/08* (2013.01); *B29K 2033/12* (2013.01); *B29K 2075/00* (2013.01); *B29K 2079/00* (2013.01); *B29K 2096/04* (2013.01); *B29K 2105/0005* (2013.01); *B29K 2105/0085* (2013.01); *B29K 2105/24* (2013.01); *C08L 2205/035* (2013.01); *C08L 2207/53* (2013.01); *C08L 2312/06* (2013.01)

(58) Field of Classification Search
CPC ... B29C 64/124; B29C 71/04; B29K 2033/08; B29K 2033/12; B29K 2075/00; B29K 2105/0085; B29K 2105/24; B33Y 10/00; B33Y 40/20; B33Y 70/00; C08F 2/46; C08F 2/48; C08F 220/18; C08F 226/06; C08F 283/006; C08G 73/0616; C08L 33/08; C08L 33/10; C08L 33/12; C08L 75/04; C08L 2312/006
USPC ......... 264/236, 331.12, 331.18, 331.19, 401, 264/494; 522/126, 153, 167, 182; 525/326.7, 454, 455
See application file for complete search history.

(56) References Cited

U.S. PATENT DOCUMENTS

| | | | |
|---|---|---|---|
| 3,597,343 A | 8/1971 | Delzenne et al. | |
| 4,578,426 A * | 3/1986 | Lenz | C08G 18/721 525/131 |
| 4,942,001 A | 7/1990 | Murphy et al. | |
| 5,487,966 A | 1/1996 | Steinmann et al. | |

(Continued)

FOREIGN PATENT DOCUMENTS

| | | |
|---|---|---|
| CN | 102317336 | 1/2012 |
| CN | 104765251 A | 7/2015 |

(Continued)

OTHER PUBLICATIONS

English Translation of First Office Acton for Japanese Patent Application No. 2023-90650 dated Nov. 27, 2024 (4 pages).

(Continued)

*Primary Examiner* — Leo B Tentoni
(74) *Attorney, Agent, or Firm* — Maynard Nexsen PC; John P. Zimmer

(57) ABSTRACT

Polymerizable liquids are described herein which, in some embodiments, can produce 3D printed articles of high resolution and desirable mechanical properties. In one aspect, a polymerizable liquid comprises an acrylate component, a polymeric additive, and a monomeric curing agent, wherein the acrylate component and monomeric curing agent are copolymerizable upon exposure to light. In being copolymerizable, the acrylate component and monomeric curing agent can form a copolymer. As described father herein, the monomeric curing agent can enable further reaction of the copolymer with one or more crosslinking species to link the copolymer with one more polymeric networks.

18 Claims, No Drawings

(56) References Cited

U.S. PATENT DOCUMENTS

| | | | | |
|---|---|---|---|---|
| 6,489,396 B2* | 12/2002 | Nakamura | ........ | C08F 220/1807 |
| | | | | 525/326.7 X |
| 2001/0024764 A1* | 9/2001 | Husemann | ......... | C08G 18/6229 |
| | | | | 522/126 X |
| 2003/0198824 A1 | 10/2003 | Fong et al. | | |
| 2010/0234519 A1 | 9/2010 | Cottrell et al. | | |
| 2017/0173872 A1 | 6/2017 | McCall et al. | | |
| 2020/0062877 A1* | 2/2020 | Knopf | ................... | C08F 220/06 |

FOREIGN PATENT DOCUMENTS

| | | | | |
|---|---|---|---|---|
| CN | 105372937 | | 3/2016 | |
| CN | 106608952 | | 5/2017 | |
| CN | 107936682 | | 4/2018 | |
| CN | 108929410 | | 4/2018 | |
| CN | 108137925 | | 6/2018 | |
| CN | 108727550 | A | 11/2018 | |
| EP | 2145931 | | 1/2010 | |
| JP | 2002194337 | A * | 7/2002 | .............. C08L 83/04 |
| JP | 2003147149 | | 5/2003 | |
| JP | 2007041082 | | 2/2007 | |
| JP | 2010-520949 | A | 6/2010 | |
| JP | 2015017153 | | 1/2015 | |
| JP | 2015017153 | A | 1/2015 | |
| JP | 2015025123 | A | 2/2015 | |
| WO | 2008110564 | | 9/2008 | |
| WO | 2017112521 | | 6/2017 | |
| WO | 2018182974 | | 10/2018 | |
| WO | 2019035387 | | 2/2019 | |

OTHER PUBLICATIONS

European Communication for EP Application 20757701.6 dated Jul. 15, 2024 (5 pages).
European Search Report for European Patent Application No. 24202317.4, dated Jan. 27, 2025 (13 pages).
PCT International Search Report for International Search Authority for PCT/US2020/041550 mailed Sep. 15, 2020 (6 pages).
PCT International Written Opinion for International Search Authority for PCT/US2020/041550 mailed Sep. 15, 2020 (9 pages).
European Patent Office (EPO) machine translation of Japanese Publication No. 2003147149 (published on May 21, 2019).
European Patent Office (EPO) machine translation of WO2019035387 (published on Feb. 19, 2019).
European Patent Office (EPO) machine translation of CN107936682 (published on Apr. 20, 2018).
European Patent Office (EPO) machine translation for Japanese Application No. JP2013143547 (Japanese Publication No. JP2015017153) (published on Jan. 29, 2015).
First Examination Report for India Patent Application No. 202217001704 dated Mar. 31, 2022 (6 pages).
English translation of First Office Action for Chinese Patent Application 202080064045.9 dated Aug. 3, 2022 (9 pages).
English translation of Chinese First Search Report for Chinese Patent Application 202080064045.9 dated Jul. 27, 2022 (4 pages).
English translation of Second Office Action for Chinese Patent Application 202080064045.9 dated Feb. 18, 2023 (9 pages).
English translation of First Office Action for Japanese Patent Application No. 2022-501237 dated Jan. 31, 2023 (2 pages).
English machine translation of Japanese Unexamined Patent Publication No. 2015-017153, obtained at the Japan Platform for Patent Information (20 pages) (published on Jan. 29, 2015).
European Communication for EP Application 20757701.6 dated Oct. 10, 2023 (6 pages).
English Translation of First Office Acton for Japanese Patent Application No. 2023-090650 dated Jun. 7, 2024 (3 pages).
European Patent Office (EPO) machine translation for Japanese Application No. 20090553129 (Japanese Publication No. JP2010-520949).

* cited by examiner

BUILD MATERIALS FOR 3D PRINTING

RELATED APPLICATION DATA

The present application is a continuation of U.S. patent application Ser. No. 16/925,975 filed Jul. 10, 2020, now U.S. Pat. No. 11,718,743 issued Aug. 8, 2023, which claims priority pursuant to 35 U.S.C. § 119 (e) to U.S. Provisional Patent Application Ser. No. 62/873,486 filed Jul. 12, 2019, each of which is incorporated herein by reference in its entirety.

FIELD

The present invention relates to three-dimensional build materials and, in particular, to polymerizable liquids for use with three-dimensional printing systems.

BACKGROUND 3D printers employ build materials, which are also known as inks, to form various 3D objects, articles, or parts in accordance with computer generated files. In some instances, the build material is solid at ambient temperatures and converts to liquid at elevated jetting temperatures. In other instances, the build material is liquid at ambient temperatures.

Build materials can comprise a variety of chemical species. Selection of chemical species to include in a build material can be selected according to various considerations including, but not limited to, desired chemical and/or mechanical properties of the printed article and operating parameters of the 3D printing apparatus. For example, ultra-violet (UV) curable acrylate formulations generally can print parts with high resolution on DLP systems. However, in many cases, the resulting parts lack desirable mechanical properties and can be prone to fracture or other degradative pathways.

SUMMARY

In view of the foregoing, polymerizable liquids are described herein which, in some embodiments, can produce 3D printed articles of high resolution and desirable mechanical properties. In one aspect, a polymerizable liquid comprises an acrylate component, a polymeric additive, and a monomeric curing agent, wherein the acrylate component and monomeric curing agent are copolymerizable upon exposure to light. In being copolymerizable, the acrylate component and monomeric curing agent can form a copolymer. As described further herein, the monomeric curing agent can enable further reaction of the copolymer with one or more crosslinking species to chemically link the copolymer with one or more polymeric networks. In some embodiments, the monomeric curing agent enables linking of the copolymer with the polymeric additive. Chemical linking of polymeric networks can provide 3D printed articles with enhanced mechanical properties. In some embodiments, the polymeric additive comprises one or more thermoplastics, such as a multiblock copolymer. In some cases, the multiblock copolymer comprises polyurethane.

In another aspect, methods of printing three-dimensional articles are described herein. In some embodiments, a method of printing a three-dimensional article comprises providing a polymerizable liquid comprising an acrylate component, a polymeric additive, and a monomeric curing agent. The polymerizable liquid is irradiated with light to form the article, the article comprising a polymeric composite material including the polymeric additive and copolymer comprising the acrylate component and monomeric curing agent. In some embodiments, the article is formed via a layer-by-layer process, wherein layer formation is administered via deposition and irradiation of a layer of the polymerizable liquid.

Additionally, the polymerizable liquid may further comprise a crosslinking component, wherein the monomeric curing agent of the copolymer is operable to initiate crosslinking reactions with the crosslinking component. The monomeric curing agent, in some embodiments, can initiate crosslinking reactions to link the copolymer with one more polymeric species in the polymerizable liquid. For example, the monomeric curing agent can initiate reactions to crosslink the copolymer with the polymeric additive. In some embodiments, crosslinking reactions are initiated subsequent to formation of the articles. The article, for example, can be heated or irradiated to initiate crosslinking or curing via the monomeric curing agent. Crosslinking or curing can induce a color change in the article, in some embodiments. Notably, such color change may occur in the absence of any pigment added to the polymerizable liquid.

In some embodiments, the polymer additive is not present in the polymerizable liquid. In such embodiments, the polymerizable liquid comprises the acrylate component, monomeric curing, and crosslinking component. Irradiation of the polymeric liquid can form a copolymer between the acrylate component and monomeric curing agent. As described herein, the monomeric curing agent of the copolymer can subsequently initiate reactions with the crosslinking component via thermal and/or light stimulation.

In another aspect, a polymerizable liquid comprises an acrylate component, a polymeric additive, and a monomeric solvent for the polymeric additive, wherein the monomeric solvent and acrylate component are copolymerizable upon exposure to light. The monomeric solvent is operable to partially solubilize or fully solubilize the polymeric additive in the polymerizable liquid. Accordingly, the monomeric solvent permits incorporation of polymeric materials into the polymerizable liquid that would otherwise phase separate in a mixture comprising the acrylate component. In some embodiments, for example, the polymeric additive comprises one or more thermoplastics. The thermoplastics can comprise multiblock copolymer, in some embodiments.

In a further aspect, a method of printing a three-dimensional article comprises providing a polymerizable liquid comprising an acrylate component, a polymeric additive, and a monomeric solvent for the polymeric additive. The polymerizable liquid is irradiated with light to form the article, the article comprising a polymeric composite material including the polymeric additive and copolymer comprising the acrylate component and monomeric solvent. In some embodiments, the article is formed via a layer-by-layer process, wherein layer formation is administered via deposition and irradiation of a layer of the polymerizable liquid.

These and other embodiments are further described in the following detailed description.

DETAILED DESCRIPTION

Embodiments described herein can be understood more readily by reference to the following detailed description and examples. Elements, apparatus and methods described herein, however, are not limited to the specific embodiments presented in the detailed description and examples. It should be recognized that these embodiments are merely illustrative of the principles of the present invention. Numerous modifications and adaptations will be readily apparent to those of skill in the art without departing from the spirit and scope of the invention.

In addition, all ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, e.g., 1.0 to 5.3, or 4.7 to 10.0, or 3.6 to 7.9.

All ranges disclosed herein are also to be considered to include the end points of the range, unless expressly stated otherwise. For example, a range of "between 5 and 10" should generally be considered to include the end points 5 and 10.

Further, when the phrase "up to" is used in connection with an amount or quantity, it is to be understood that the amount is at least a detectable amount or quantity. For example, a material present in an amount "up to" a specified amount can be present from a detectable amount and up to and including the specified amount.

The terms "three-dimensional printing system," "three-dimensional printer," "printing," and the like generally describe various solid freeform fabrication techniques for making three-dimensional articles or objects by selective deposition, jetting, fused deposition modeling, multijet modeling, and other additive manufacturing techniques now known in the art or that may be known in the future that use a build material or ink to fabricate three-dimensional objects.

In one aspect, polymerizable liquids for use in 3D printing applications are described herein. The polymerizable liquids, for example, can be employed in DLP, SLA, and MJP printing applications, in some embodiments. A polymerizable liquid comprises an acrylate component, a polymeric additive, and a monomeric curing agent, wherein the acrylate component and monomeric curing agent are copolymerizable upon exposure to light. In being copolymerizable, the acrylate component and monomeric curing agent can form a copolymer.

The acrylate component can comprise one or a mixture of light polymerizable acrylate species. In some embodiments, for example, the acrylate component can comprise acrylate monomer, acrylate oligomer, or mixtures thereof. As known to the skilled artisan, a monomer is a single structural unit of a polymer or copolymer and is not an oligomer or polymer. In contrast, an oligomer comprises a plurality of chemically linked monomers. In some embodiments, the acrylate component can comprise monofunctional acrylates, difunctional acrylates, or mixtures thereof. In some embodiments, for instance, the acrylate component comprises methyl (meth)acrylate, ethyl (meth)acrylate, n-propyl (meth)acrylate, n-butyl (meth)acrylate, isobutyl (meth)acrylate, n-hexyl (meth)acrylate, 2-ethylhexyl (meth)acrylate, n-octyl (meth)acrylate, n-decyl (meth)acrylate, n-dodecyl (meth)acrylate, 2-hydroxyethyl (meth)acrylate, 2- or 3-hydroxypropyl (meth)acrylate, 2-methoxyethyl (meth)acrylate, 2-ethoxyethyl (meth)acrylate, 2- or 3-ethoxypropyl (meth)acrylate, tetrahydrofurfuryl methacrylate, isobornyl (meth)acrylate, 2-(2-ethoxyethoxy)ethyl acrylate, cyclohexyl methacrylate, 2-phenoxyethyl acrylate, glycidyl acrylate, isodecyl acrylate, 2-phenoxyethyl (meth)acrylate, lauryl methacrylate, or mixtures thereof. In some embodiments, the acrylate component comprises a monofunctional or difunctional aliphatic urethane (meth)acrylate.

The acrylate component, in some embodiments, can comprise one or more of allyl acrylate, allyl methacrylate, triethylene glycol di(meth)acrylate, tricyclodecane dimethanol diacrylate, and cyclohexane dimethanol diacrylate. Additionally, in some embodiments, the acrylate component comprises diacrylate and/or dimethacrylate esters of aliphatic, cycloaliphatic or aromatic diols, including 1,3- or 1,4-butanediol, neopentyl glycol, 1,6-hexanediol, diethylene glycol, triethylene glycol, tetraethylene glycol, polyethylene glycol, tripropylene glycol, ethoxylated or propoxylated neopentyl glycol, 1,4-dihydroxymethylcyclohexane, 2,2-bis(4-hydroxycyclohexyl)propane or bis(4-hydroxycyclohexyl)methane, hydroquinone, 4,4'-dihydroxybiphenyl, bisphenol A, bisphenol F, bisphenol S, ethoxylated or propoxylated bisphenol A, ethoxylated or propoxylated bisphenol F or ethoxylated or propoxylated bisphenol S.

Additional non-limiting examples of species suitable for inclusion in the acrylate component comprise the following: isobornyl acrylate (IBOA), commercially available from SARTOMER under the trade name SR 506A; isobornyl methacrylate, commercially available from SARTOMER under the trade name SR 423A; alkoxylated tetrahydrofurfuryl acrylate, commercially available from SARTOMER under the trade name SR 611; monofunctional urethane acrylate, commercially available from RAHN USA under the trade name GENOMER 1122; aliphatic urethane diacrylate, commercially available from ALLNEX under the trade name EBECRYL 8402; difunctional aliphatic urethane (meth)acrylate, commercially available from DYMAX under the BR-952 trade designation; triethylene glycol diacrylate, commercially available from SARTOMER under the trade name SR 272; and triethylene glycol dimethacrylate, commercially available from SARTOMER under the trade name SR 205. Other commercially available curable components may also be used. In addition, in some cases, a monofunctional or difunctional acrylate comprises an aliphatic polyester urethane acrylate oligomer, a urethane (meth)acrylate resin, and/or an acrylate amine oligomeric resin, such as EBECRYL 7100. In some embodiments, the acrylate component comprises one or more acrylate derivatives such as acryloylmorpholine.

The acrylate component can be present in the polymerizable liquid in any amount consistent with the objectives described herein. In some embodiments, the acrylate component is present in an amount up to about 90 wt. %, up to about 85 wt. %, up to about 80 wt. %, or up to about 75 wt. %, based on the total weight of the ink in an amount up to about 90 wt. %, up to about 85 wt. %, up to about 80 wt. %, or up to about 75 wt. %, based on the total weight of the polymerizable liquid. For example, the acrylate component can be present in an amount of 20-90 wt. %. In some embodiments, the polymerizable liquid comprises about 20-70 wt. %, 40-90 wt. %, 55-90 wt. %, 60-90 wt. %, 65-90 wt. %, 65-85 wt. %, 70-90 wt. %, 75-90 wt. %, or 80-90 wt. % acrylate component, based on the total weight of the ink. Moreover, in some embodiments, the polymerizable liquid comprises 30-45 wt. % or 50-70 wt. % acrylate component, based on the total weight of the ink.

In addition to the monofunctional and difunctional acrylate species components described above, it is also possible, in some cases, to include trifunctional or higher functional acrylate species in a polymerizable liquid described herein. For example, in some instances, one or more tri(meth)acrylates may be used. However, it is to be understood that the functionality (i.e., mono-, di-, tri-, or higher functionality) and the molecular weight of the acrylate species described herein can be selected to provide a build material having a viscosity suitable for use in a desired 3D printing system. Non-limiting examples of trifunctional or higher (meth)acrylates that may be suitable for use in some embodiments described herein include 1,1-trimethylolpropane tri(meth)acrylate, ethoxylated or propoxylated 1,1,1-trimethylolpropanetri(meth)acrylate, ethoxylated or propoxylated glycerol tri(meth)acrylate, pentaerythritol monohydroxy tri(meth)acrylate, dipentaerythritol monohydroxy penta(meth)acrylate, and bis(trimethylolpropane) tetra(meth)acrylate.

As described herein, the polymerizable liquid also comprises a polymeric additive. Inclusion of a polymeric additive with the acrylate component can improve one or more mechanical properties of articles formed from the polymerizable liquid via additive manufacturing techniques. In some embodiments, inclusion of the polymeric additive can enhance one or more of tensile strength, shear strength, flexibility, elongation, heat deflection temperature and/or impact resistance of the article.

In some cases, polymeric additives described herein comprise one or more thermoplastics or thermoplastic components. Thermoplastics described herein can comprise multiblock copolymer. In some embodiments, for example, the polymeric additive comprises a thermoplastic polyurethane (TPU). The thermoplastic polyurethane can be a polyester TPU, a polyether TPU, a polycaprolactone TPU, or mixtures thereof. In some cases, the thermoplastic polyurethane is aromatic (based on isocyanates such as MDI) or aliphatic (based on isocyanates such as H12 MDI, HDI, and IPDI). TPU can have hard and soft sequences or domains, where the hard segments are formed from short-chain diols ("chain extenders"), and the soft segments formed from long-chain diols. The ratios of hard to soft can be varied, as well as the structure and/or molecular weight of the diols, to produce TPU variants having a wide range of physical properties.

The polymeric additive can be present in the polymerizable liquid in any amount consistent with the objectives described herein. Amount of polymeric additive in the polymerizable liquid can be selected according to several considerations including, but not limited to, chemical identity of the acrylate component, chemical identity of the polymeric additive, and/or desired mechanical properties of the resultant articles formed from the polymerizable liquid via additive manufacturing. In some embodiments, the polymeric additive is present in a build material in an amount of 5-50 wt. %, 10-40 wt. %, 15-35 wt. %, 20-30 wt. %, 5-25 wt. %, 5-20 wt. %, 5-15 wt. %, 5-10 wt. %, 10-25 wt. %, 30-40 wt. %, 14-20 wt. %, 5 wt. %, 7 wt. %, 9 wt. %, 10 wt. %, 12 wt. %, 14 wt. %, 16 wt. %, 18 wt. %, 20 wt. %, 22 wt. %, 24 wt. %, 26 wt. %, 28 wt. %, or 30 wt. %, In addition to the acrylate component and polymeric additive, the polymerizable liquid also comprises a monomeric curing agent. The acrylate component and monomeric curing agent are copolymerizable upon exposure to light. In being copolymerizable, the acrylate component and monomeric curing agent form a copolymer. Notably, the monomeric curing agent can enable further reaction of the copolymer with one or more crosslinking species to link the copolymer with one or more polymeric networks. In some embodiments, the monomeric curing agent enables linking of the copolymer with the polymeric additive. Chemical linking of polymeric networks can provide 3D printed articles with enhanced mechanical properties. Additionally, chemical linking between polymeric networks presents a fundamentally different structure compared to polymeric networks that physically interpenetrate with one another.

Subsequent to formation of a copolymer with the acrylate component, the monomeric curing agent can further react with one or more crosslinking species. In some embodiments, heat or light is applied to stimulate reaction between the monomeric curing agent and crosslinking species. The monomeric curing agent, in some embodiments, can serve as an initiator or catalyst for crosslinking reactions. The monomeric curing agent can comprise any species operable to copolymerize with the acrylate component while maintaining functionality for participating in crosslinking reactions subsequent to copolymer formation. In some embodiments, the monomeric curing agent serves as an initiator or catalyst for the crosslinking reactions. In some embodiments, for example, the monomeric curing agent comprises one or more imidazoles, wherein the imidazoles are operable for copolymerization with the acrylate component. In one embodiment, for example, the monomeric curing agent comprises vinyl-imidazole. Epoxy and/or isocyanate crosslinking species can react with the imidazole to form crosslinks between the imidazole-acrylate copolymer and polymeric additive or other species in the polymerizable liquid, in some embodiments. In some cases, unsaturated nitrogen in the imidazole ring can act as an anionic initiator and form a 1:1 epoxy-imidazole adduct, which can then further polymerize by reacting with another epoxy resin crosslinking component.

In some embodiments, the complete article or a section thereof is formed prior initiation of reaction between the monomeric curing agent and crosslinking component. For example, the article can be printed via copolymerization of the acrylate component and monomeric curing agent. Subsequent formation, the article can be heated or irradiated to initiate reaction between the monomeric curing agent and crosslinking component.

Additionally, in some embodiments, the monomeric curing agent can partially solubilize or fully solubilize the polymeric additive. Accordingly, the monomeric curing agent can permit incorporation of polymeric materials into the polymerizable liquid that would otherwise phase separate in a mixture comprising the acrylate component. In some embodiments, for example, the monomeric curing agent can be a solvent for one or more TPU species described above.

The monomeric curing agent can be present in the polymerizable liquid in any desired amount. Amount of monomeric curing agent can be selected according to several considerations including, but not limited to, the chemical identity of the acrylate component and the desired amount of crosslinking between copolymer incorporating the monomeric curing agent and one or more polymeric species in the polymerizable liquid. Generally, the monomeric curing agent can be present in the polymerizable liquid in an amount of 2 to 20 weight percent.

A crosslinking component for reaction with the monomeric curing agent can comprise an epoxy resin, an isocyanate component, a polyol component, or mixtures thereof. Any epoxy resin not inconsistent with the objectives of this disclosure can be used, such as epoxidized bisphenol A, epoxidized bisphenol F, epoxidized phenol Novolak epoxy, epoxidized cresol Novolak epoxy, brominated multifunctional epoxy, multifunctional epoxy resin (TGMDA or TGPAP), cyclo-aliphatic epoxy, epoxidized polypropylene glycol carrier (weight average molecular weight 400, 1000, or 2000), epoxidized phenoxyethylacrylate carrier, or any combination thereof. Any isocyanate component not inconsistent with the objectives of this disclosure can be used. Exemplary isocyanate components include aliphatic diisocyanates such as hexamethylene diisocyanate (HDI), methylene dicyclohexyl diisocyanate (HMDI) or hydrogenated MDI, isophorone diisocyanate (IPDI). Any polyol component not inconsistent with the objectives of this disclosure can also be used.

In some embodiments, a crosslinking component can be coated on a particle to form a core-shell configuration. Particles coated with crosslinking component can have any desired chemical identity. Chemical identity of the particles can be selected according to several considerations including, but not limited to, the identity of the acrylate component and desired mechanical properties of the resultant article formed from the polymerizable liquid via additive manufacturing. In some embodiments, the particles comprise thermoplastic or thermoset materials. Alternatively, the particles can comprise elastomer. In some embodiments, for example, coated particles are commercially available from Kaneka Texas Corporation under the Kane Ace® MX trade designation. Particle coatings are operable to crosslink with the acrylate copolymer comprising the monomeric curing agent. The monomeric curing agent, for example, can react with the crosslinking component of the particles to chemically link the coated particles to the acrylate copolymer incorporating the monomeric curing agent.

The crosslinking component can be present in the polymerizable liquid in any desired amount. Amount of crosslinking component can be selected according to several considerations including, but not limited to, the identity of the copolymer comprising the acrylate component and monomeric curing agent, identity of the crosslinking component, and/or desired amount of crosslinking. Generally, the crosslinking component can be present in the polymerizable liquid in an amount of 15-50 weight percent.

In some embodiments, the polymerizable liquid does not include the polymeric component. The polymerizable liquid, for example, can comprise the acrylate component, the crosslinking component, and the monomeric curing agent, wherein the acrylate component and monomeric curing agent are copolymerizable upon exposure to light. In such embodiments, the acrylate component and monomeric curing agent form a copolymer. As described herein, the monomeric curing agent of the copolymer can subsequently react with species of the crosslinking component. In this way, the copolymer comprising the monomeric curing agent and acrylate component is chemically linked with one or more polymeric networks formed by the crosslinking component. The monomeric curing agent, in some embodiments, is activated by heat or light to react with the crosslinking component. The monomeric curing agent, for example, can be a catalyst or initiator for reaction and crosslinking with the crosslinking component.

The polymerizable liquid also comprises a photoinitiator component for initiating copolymerization of the acrylate component and monomeric curing agent upon exposure to light. Any photoinitiator not inconsistent with the objectives of the present disclosure can be used. In some embodiments, a photoinitiator comprises an alpha-cleavage type (unimolecular decomposition process) photoinitiator or a hydrogen abstraction photosensitizer-tertiary amine synergist, operable to absorb light preferably between about 250 nm and about 420 nm or between about 300 nm and about 385 nm, to yield free radical(s).

Examples of alpha cleavage photoinitiators are Irgacure 184 (CAS 947-19-3), Irgacure 369 (CAS 119313-12-1), and Irgacure 819 (CAS 162881-26-7). An example of a photosensitizer-amine combination is Darocur BP (CAS 119-61-9) with diethylaminoethylmethacrylate.

In addition, in some instances, suitable photoinitiators comprise benzoins, including benzoin, benzoin ethers, such as benzoin methyl ether, benzoin ethyl ether and benzoin isopropyl ether, benzoin phenyl ether and benzoin acetate, acetophenones, including acetophenone, 2,2-dimethoxyacetophenone and 1,1-dichloroacetophenone, benzil, benzil ketals, such as benzil dimethyl ketal and benzil diethyl ketal, anthraquinones, including 2-methylanthraquinone, 2-ethylanthraquinone, 2-tert-butylanthraquinone, 1-chloroanthraquinone and 2-amylanthraquinone, triphenylphosphine, benzoylphosphine oxides, for example 2,4,6-trimethylbenzoyldiphenylphosphine oxide (Lucirin TPO), benzophenones, such as benzophenone and 4,4'-bis(N,N'-dimethylamino)benzophenone, thioxanthones and xanthones, acridine derivatives, phenazine derivatives, quinoxaline derivatives or 1-phenyl-1,2-propanedione, 2-O-benzoyl oxime, 1-aminophenyl ketones or 1-hydroxyphenyl ketones, such as 1-hydroxycyclohexyl phenyl ketone, phenyl 1-hydroxyisopropyl ketone and 4-isopropylphenyl 1-hydroxyisopropyl ketone.

Suitable photoinitiators can also comprise those operable for use with a HeCd laser radiation source, including acetophenones, 2,2-dialkoxybenzophenones and 1-hydroxyphenyl ketones, such as 1-hydroxycyclohexyl phenyl ketone or 2-hydroxyisopropyl phenyl ketone (=2-hydroxy-2,2-dimethylacetophenone). Additionally, in some cases, suitable photoinitiators comprise those operable for use with an Ar laser radiation source including benzil ketals, such as benzil dimethyl ketal. In some embodiments, a photoinitiator comprises an ∝-hydroxyphenyl ketone, benzil dimethyl ketal or 2,4,6-trimethylbenzoyldiphenylphosphine oxide or a mixture thereof.

Another class of suitable photoinitiators, in some instances, comprises ionic dye-counter ion compounds capable of absorbing actinic radiation and generating free radicals for polymerization initiation. In some embodiments, polymerizable liquids containing ionic dye-counter ion compounds can be polymerized upon exposure to visible light within the adjustable wavelength range of about 400 nm to about 700 nm. Ionic dye-counter ion compounds and their mode of operation are disclosed in EP-A-0 223 587 and U.S. Pat. Nos. 4,751,102; 4,772,530; and 4,772,541.

A photoinitiator can be present in a polymerizable liquid described herein in any amount not inconsistent with the objectives of the present disclosure. In some embodiments, a photoinitiator is present in an amount of up to about 5 wt. %, based on the total weight of the polymerizable liquid. In some cases, a photoinitiator is present in an amount ranging from about 0.1 wt. % to about 5 wt. %.

Moreover, in some embodiments, a polymerizable liquid described herein can further comprise one or more sensitizers. A sensitizer can be added to increase the effectiveness of one or more photoinitiators that may also be present. Any sensitizer not inconsistent with the objectives of the present disclosure may be used. In some cases, a sensitizer comprises isopropylthioxanthone (ITX) or 2-chlorothioxanthone (CTX).

A sensitizer can be present in the polymerizable liquid in any amount not inconsistent with the objectives of the present disclosure. In some embodiments, a sensitizer is present in an amount ranging from about 0.1 wt. % to about 2 wt. % or from about 0.5 wt. % to about 1 wt. %, based on the total weight of the polymerizable liquid.

In some embodiments, one or more UV-absorbers and/or light stabilizers can be present in the polymerizable liquid. In some embodiments, for example, one or more UV-absorbers and/or light stabilizers can be present in an amount of 0.1-2 wt. %, based on the total weight of the polymerizable liquid. In some embodiments, UV-absorbers and/or light stabilizers are commercially available from BASF of Florham Park, New jersey under the TINUVIN® trade-designation.

In another aspect, methods of printing a 3D article or object are described herein. Methods of printing a 3D article or object can include forming the 3D article from a plurality of layers of a polymerizable liquid described herein in a layer-by-layer manner. Any polymerizable material described herein may be used in the fabrication of the article by additive manufacturing.

In some embodiments, a method of printing a three-dimensional article comprises providing a polymerizable liquid comprising an acrylate component, a polymeric additive, and a monomeric curing agent. The polymerizable liquid is irradiated with light to form the article, the article comprising a polymeric composite material including the polymeric additive and copolymer comprising the acrylate component and monomeric curing agent. In some embodiments, the article is formed via a layer-by-layer process wherein layer formation is administered via deposition and irradiation of a layer of the polymerizable liquid. The acrylate component, polymeric additive and monomeric curing agent can have any composition and/or properties described herein. In some embodiments, for example, the polymeric additive comprises one or more TPU species and the monomeric curing agent comprises one or more polymerizable imidazole species.

As described herein, the polymerizable liquid may further comprise a crosslinking component. The crosslinking component can have any composition and/or properties described herein. In some embodiments, for example, the crosslinking component comprises epoxy resin, an isocyanate component, a polyol component, or mixtures thereof. Additionally, the crosslinking component can be coated on particles as described herein. In embodiments where the crosslinking component is present in the polymerizable liquid, a method of printing a 3D article can further comprise crosslinking the crosslinking component with the copolymer comprising the acrylate component and monomeric curing agent. In some embodiments, the crosslinking is initiated by reaction of the monomeric curing agent with the crosslinking component. The monomeric curing agent, for example, can be a catalyst or initiator of the crosslinking reaction. Heat or light can be applied after formation of the copolymer comprising the monomeric curing agent and acrylate component to initiate crosslinking between the copolymer and crosslinking component. In some embodiments, the crosslinking component chemically binds the copolymer to one or more polymer networks. For example, the crosslinking component can chemically bind the copolymer comprising the acrylate component and monomeric curing agent to the polymeric additive of the polymerizable liquid. In particular embodiments, the crosslinking component can chemically bind the copolymer to one or more TPU species of the polymerizable liquid. Alternatively, the crosslinking component can chemically bind the copolymer comprising the acrylate component and monomeric curing agent to particles coated with the crosslinking component.

In some embodiments, the three-dimensional article printed from the polymerizable liquid is black in color following crosslinking reaction between the monomeric curing agent and crosslinking component. In such embodiments, the polymerizable liquid does not comprise or substantially comprise any pigment species. Accordingly, a desirable black color can be achieved with materials and systems described herein without the need to add pigment to the polymerizable liquid. The black color of the three-dimensional article can be homogeneous or substantially homogeneous throughout the article, in some embodiments.

In another aspect, a polymerizable liquid comprises an acrylate component, a polymeric additive, and a monomeric solvent for the polymeric additive, wherein the monomeric solvent and acrylate component are copolymerizable upon exposure to light. In some embodiments, the acrylate component and polymeric additive can comprise any composition and/or properties described hereinabove.

The monomeric solvent is operable to partially solubilize or fully solubilize the polymeric additive in the polymerizable liquid. Accordingly, the monomeric solvent permits incorporation of polymeric materials into the polymerizable liquid that would otherwise phase separate in a mixture comprising the acrylate component. In some embodiments, for example, the polymeric additive comprises one or more thermoplastics, including any of the TPU species described herein. In some embodiments, the monomeric solvent is operable to partially solubilize or fully solubilize one or more TPU species in the polymerizable liquid. In some embodiments, the monomeric solvent comprises N-vinyl caprolactam, N-vinyl imidazole, N-vinylpyrrolidone, acrylate monomer, or mixtures thereof.

The monomeric solvent can be present in the polymerizable liquid in any amount consistent with the objectives described herein. Amount of monomeric solvent in the polymerizable liquid can be selected according to several considerations including, but not limited to, the identity of the polymeric additive, the amount of polymeric additive, and/or the identity of the acrylate component. Generally, the monomeric solvent can be present in an amount of 2-20 weight percent of the polymerizable liquid.

In a further aspect, a method of printing a three-dimensional article comprises providing a polymerizable liquid comprising an acrylate component, a polymeric additive, and a monomeric solvent for the polymeric additive. The polymerizable liquid is irradiated with light to form the article, the article comprising a polymeric composite material including the polymeric additive and copolymer comprising the acrylate component and monomeric solvent. In some embodiments, the article is formed via a layer-by-layer process, wherein layer formation is administered via deposition and irradiation of a layer of the polymerizable liquid.

In some embodiments, layers of polymerizable liquids can be deposited according to an image of the 3D article in a computer readable format during formation of the three-dimensional article. The polymerizable liquid can be deposited according to preselected computer aided design (CAD) parameters. Moreover, in some cases, one or more layers of the polymerizable liquid described herein has a thickness of about 10 µm to about 100 µm, about 10 µm to about 80 µm, about 10 µm to about 50 µm, about 20 µm to about 100 µm, about 20 µm to about 80 µm, or about 20 µm to about 40 µm. Other thicknesses are also possible.

Additionally, it is to be understood that methods of printing a 3D article described herein can include so-called "multi-jet" or "stereolithography" 3D printing methods. For example, in some instances, a multi-jet method of printing a 3D article comprises selectively depositing layers of a polymerizable liquid described herein onto a substrate, such as a build pad of a 3D printing system. In addition, in some embodiments, a method described herein further comprises supporting at least one of the layers of the polymerizable liquid with a support material. Any support material not inconsistent with the objectives of the present disclosure may be used.

It is also possible to form a 3D article from a polymerizable liquid described herein using stereolithography. For example, in some cases, a method of printing a 3D article comprises retaining the polymerizable liquid in a container and selectively applying energy to the polymerizable liquid in the container to solidify at least a portion of a polymerizable liquid, thereby forming a solidified layer that defines a cross-section of the 3D article. Additionally, a method described herein can further comprise raising or lowering the solidified layer to provide a new or second layer of polymerizable liquid, followed by again selectively applying energy to the polymerizable liquid in the container to solidify at least a portion of the new or second polymerizable liquid that defines a second cross-section of the 3D article. Further, the first and second cross-sections of the 3D article can be bonded or adhered to one another in the z-direction (or build direction corresponding to the direction of raising or lowering recited above) by the application of the energy for solidifying the polymerizable liquid. Moreover, selectively applying energy to the polymerizable liquid in the container can comprise applying electromagnetic radiation, such as UV and/or visible radiation, having a sufficient energy to initiate polymerization of the polymerizable material as described herein. In addition, in some cases, raising or lowering a solidified layer of polymerizable liquid is carried out using an elevator platform disposed in the container of fluid build material. A method described herein can also comprise planarizing a new layer of polymerizable liquid provided by raising or lowering an elevator platform. Such planarization can be carried out, in some cases, by a wiper or roller.

In another aspect, printed 3D articles are described herein. In some embodiments, a printed 3D article is formed from any of the polymerizable liquids described herein. 3D articles formed from polymerizable liquids described herein can have an impact resistance that is greater than 1 ft·lb/in., in some embodiments. A 3D article, for example, can exhibit an impact resistance of 1.1-2 ft·lb/in., in some embodiments. Impact resistance can be determined accordint to ASTM D256, in some embodiments. In other embodiments, a 3D article can exhibit an impact resistance of 0.4-1.0 ft·lb/in.

Additionally, 3D articles printed from polymerizable liquids described herein can exhibit flexural modulus at 25° C. ranging from 1400 to 3500 MPa, in some embodiments. Flexural modulus of the 3D article can be 1400 to 1700 MPa or 2000 to 3200, in some embodiments.

Moreover, 3D articles printed from polymerizable liquids described herein can exhibit heat deflection temperatures (HDT) by DMA ranging from 110° C. to 190° C., in some embodiments. HDT of a 3D article, for example can range from 110° C. to 130° C. or 150° C. to 185° C., in some embodiments. As illustrated in the examples below, properties of the 3D article can be tailored by varying compositional parameters of the polymerizable liquid employed to print the 3D article.

These foregoing embodiments are further illustrated in the following non-limiting examples.

EXAMPLES

Table 1 provides formulations of polymerizable liquids according to some embodiments described herein.

TABLE I

| | Polymerizable Liquids | | | | |
|---|---|---|---|---|---|
| | Formula 1 | Formula 2 | Formula 3 | Formula 4 | Formula 5 |
| | TPU + Vinylimidazdol | TPU + Vinylimidazdol & Epoxy | TPU + Vinylimidazdol & isocyanate HDI | Polyol + Vinylimidazdol & isocyanate HDI | Polyol + Vinylimidazdol & isocyanate HDI |
| TPU | 28 | Add 90% of Formula 1 | add 90% of Formula 1 | | |
| Acrylate component | 64.5 | | | 64.5 | 49.5 |
| Monomeric curing agent (vinylimidazol) | 5 | 0.5 | 0.5 | 5 | 5 |
| Crosslinking component (Epoxy resin) | | 10 | | | |
| Crosslinking Component (Core Shell epoxy coated elastomer) | | | | | 15 |
| Crosslinking Component (Isocyanate HDI) | | | 10 | 10 | 10 |
| (Crosslinking Component) Polyol | | | | 18 | 18 |
| Photoinitiator | 2.5 | 2.5 | 2.5 | 2.5 | 2.5 |
| colorant | 0.02 | 0.02 | 0.02 | 0.02 | 0.02 |
| Total % weight | 100.02 | 100.02 | 100.02 | 100.02 | 100.02 |

Table II shows the physical properties of 3D articles printed using Formulas 1-5, where Formula 1 was polymerized by exposure to UV light, and Formulas 2-5 were polymerized by exposure to UV light to form copolymer comprising the acrylate component and monomeric curing agent. Subsequent to 3D article formation, crosslinking via the monomeric curing agent was induced by heating at 110° C. for 2 hours.

TABLE II

Physical Properties of Formulas 1-5

|  | Formula 1 | Formula 2 | Formula 3 | Formula 4 | Formula 5 |
| --- | --- | --- | --- | --- | --- |
|  | TPU + Vinylimidazdol | TPU + Vinylimidazdol & Epoxy | TPU + Vinylimidazdol & isocyanate HDI | Polyol + Vinylimidazdol & isocyanate HDI | Polyol + Vinylimidazdol & isocyanate HDI |
| Curing | UV only | UV + 2 hrs at 110 C. | UV + 2 hrs at 110 C. | UV + 2 hrs at 110 C. | UV + 2 hrs at 110 C. |
| Flexural Modulus (MPa) | 1431 | 1436 | 1570 | 1405 | 1968 |
| Elongation at break - Tensile strength (psi) | 6388 | 4599 | 6200 | 5170 | 6091 |
| Elongation at break - Tensile modulus (psi) | 225 | 165 | 235 | 177 | 205 |
| Elongation at break - average elongation (%) | 38 | 22.3 | 32.1 | 42.8 | 11.8 |
| Impact Resistance - Average (ft · lb./in.) | 1.42 | 0.82 | 1.32 | 0.69 | 0.32 |
| Impact Resistance - Highest (ft · lb./in.) | 1.54 | 0.97 | 1.48 | 0.75 | 0.35 |
| Viscosity at 30 C. (cps) | 16520 | 8300 | 13460 | 560 | 621 |
| Tg (C.) | 62 | 28 | 72 |  |  |
| Flex-Modulus at 25 C. | 1780 | 1460 | 1382 |  |  |

Table III provides formulations of polymerizable liquids according to some embodiments described herein.

TABLE III

Polymerizable Liquids

|  | Formula 6 | Formula 7 | Formula 8 | Formula 9 | Formula 10 | Formula 11 |
| --- | --- | --- | --- | --- | --- | --- |
| TPU | — | — | — | — | — | — |
| Acrylate component | 65.0 | 50.0 | 50.0 | 57.0 | 62.0 | 63.0 |
| Monomeric curing agent (vinylimidazol) | 2.5 | 5.0 | 5.0 | 5.0 | 5.0 | 4.0 |
| Crosslinking component (Epoxy resin) | — | — | — | 35.0 | — | — |
| Crosslinking Component (Core Shell epoxy coated elastomer) | 30 | 37.0 | 42.0 | — | 30.0 | 30.0 |
| Photoinitiator | 2.0 | 2.5 | 2.5 | 2.5 | 2.5 | 2.5 |
| colorant | 0.52 | 0.52 | 0.52 | 0.52 | 0.52 | 0.52 |
| Total % weight | 100.02 | 95.02 | 100.02 | 100.02 | 100.02 | 100.02 |

Table IV shows the physical properties of 3D articles printed using Formulas 6-11.

TABLE IV

Physical Properties of Formulas 6-11

|  | Formula 6 | Formula 7 | Formula 8 | Formula 9 | Formula 10 | Formula 11 |
| --- | --- | --- | --- | --- | --- | --- |
| Elongation at break - Tensile strength (psi) | 12892 | 10856 | 10695 | 5334 | 11799 | 11011 |

TABLE IV-continued

Physical Properties of Formulas 6-11

| | Formula 6 | Formula 7 | Formula 8 | Formula 9 | Formula 10 | Formula 11 |
|---|---|---|---|---|---|---|
| Elongation at break - Tensile modulus (psi) | 401 | 349 | 348 | 556 | 381 | 360 |
| Elongation at break -average elongation (%) | 6.6 | 7.1 | 4.9 | 0.8 | 5.6 | 7.2 |
| Impact Resistance - Average (ft. lb./in.) | 0.62 | 0.54 | — | — | 0.49 | 0.43 |
| Viscosity at 30 C. (cps) | 215 | — | — | — | — | 105 |
| Tg (C.) | 123 | — | — | 113 | 120 | — |
| Flex-Modulus at 25 C. | 2153 | — | — | 3155 | 2143 | — |
| HDT by DMA (C.) | 128 | — | — | 117 | 120 | — |
| HDT 0.46 MPa (C.) | 118 | — | — | — | — | — |

Table V provides formulations of polymerizable liquids according to some embodiments described herein.

TABLE V

Polymerizable Liquids

| | Formula 12 | Formula 13 | Formula 14 | Formula 15 | Formula 16 | Formula 17 | Formula 18 | Formula 19 |
|---|---|---|---|---|---|---|---|---|
| TPU | 38.0 | 33.0 | 33.0 | 35.0 | 35.0 | 38.0 | 38.0 | 38.0 |
| Acrylate component | 25.6 | 43.0 | 42.0 | 37.0 | 36.6 | 32.6 | 25.6 | 27.9 |
| Monomeric curing agent (vinylimidazol) | 7.0 | 5.0 | 6.0 | 6.0 | 6.0 | 7.0 | 7.0 | 5.0 |
| Crosslinking component (Epoxy resin) | — | — | — | — | — | — | — | — |
| Crosslinking Component (Core Shell epoxy coated elastomer) | 25.0 | 15.0 | 15.0 | 18.0 | 18.0 | 18.0 | 25.0 | 25.0 |
| Photoinitiator | 2.5 | 2.5 | 2.5 | 2.5 | 2.5 | 2.5 | 2.5 | 2.5 |
| colorant | 0.5 | 0.5 | 0.5 | 0.5 | 0.8 | 0.8 | 0.8 | 0.5 |
| UV absorber | 1.4 | 1.0 | 1.0 | 1.0 | 1.1 | 1.1 | 1.1 | 1.1 |
| Total % weight | 100.0 | 100.0 | 100.0 | 100.0 | 100.0 | 100.0 | 100.0 | 100.0 |

Table VI shows the physical properties of 3D articles printed using Formulas 12-19.

| | Formula 12 | Formula 13 | Formula 14 | Formula 15 | Formula 16 | Formula 17 | Formula 18 | Formula 19 |
|---|---|---|---|---|---|---|---|---|
| Elongation at break - Tensile strength (psi) | 12733 | 12398 | 13198 | 13226 | — | 11118 | 10337 | 11894 |
| Elongation at break - Tensile modulus (psi) | 424 | 476 | 483 | 464 | — | 485 | 440 | 421 |
| Elongation at break - average elongation (%) | 4.2 | 3.2 | 3.6 | 4.0 | — | 2.8 | 3.0 | 3.9 |
| Impact Resistance - Average (ft. lb./in.) | 0.50 | — | — | 0.44 | — | 0.40 | 0.55 | 0.52 |
| Viscosity at 30 C. (cps) | 520 | — | — | — | — | — | 500 | — |
| Tg (C.) | 140 | — | 141 | 149 | 141 | 157 | 126 | 155 |

-continued

|  | Formula 12 | Formula 13 | Formula 14 | Formula 15 | Formula 16 | Formula 17 | Formula 18 | Formula 19 |
|---|---|---|---|---|---|---|---|---|
| Flex-Modulus at 25 C. | 2386 | — | 2319 | 2449 | 2552 | 2474 | 2376 | 2109 |
| HDT by DMA (C.) | 177 | — | 151 | 156 | 153 | 160 | 173 | 180 |
| HDT 1.82 MPa (C.) | 151 |  | 124 | 126 | 119 | 131 | 132 | 148 |

All patent documents referred to herein are incorporated by reference in their entireties. Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the invention.

The invention claimed is:

1. A polymerizable liquid comprising:
   an acrylate component;
   a crosslinking component; and
   a monomeric curing agent,
   wherein the acrylate component and the monomeric curing agent are copolymerizable upon exposure to light; and
   wherein the crosslinking component is coated on particles.

2. The polymerizable liquid of claim 1, wherein the monomeric curing agent includes N-vinyl moiety.

3. The polymerizable liquid of claim 1, wherein the monomeric curing agent comprises one or more imidazoles.

4. The polymerizable liquid of claim 1, wherein the monomeric curing agent is present in an amount of 2-20 weight percent.

5. The polymerizable liquid of claim 1, wherein the crosslinking component is present in an amount of 15-50 weight percent.

6. The polymerizable liquid of claim 1, wherein said particles are elastomeric.

7. The polymerizable liquid of claim 1, wherein the crosslinking component comprises an epoxy resin, an isocyanate component, a polyol component, or mixtures thereof.

8. The polymerizable liquid of claim 7, wherein the crosslinking component comprises an epoxy resin, and wherein the epoxy resin is one or more of epoxidized bisphenol A, epoxidized bisphenol F, epoxidized phenol Novolak epoxy, epoxidized cresol Novolak epoxy, brominated multifunctional epoxy, multifunctional epoxy resin, cyclo-aliphatic epoxy, epoxidized polypropylene glycol carrier with a weight average molecular weight 400, 1000, or 2000, epoxidized phenoxyethylacrylate carrier, or mixtures thereof.

9. The polymerizable liquid of claim 7, wherein the crosslinking component comprises an isocyanate component, and wherein the isocyanate component is an aliphatic diisocyanate.

10. The polymerizable liquid of claim 9, wherein the aliphatic diisocyanate is at least one of hexamethylene diisocyanate, methylene dicyclohexyl diisocyanate, hydrogenated methylene dicyclohexyl diisocyanate, isophorone diisocyanate, or mixtures thereof.

11. The polymerizable liquid of claim 1, further comprising a polymeric additive.

12. The polymerizable liquid of claim 11, wherein the polymeric additive comprises one or more thermoplastics.

13. A method of printing a three-dimensional article comprising:
   providing a polymerizable liquid comprising an acrylate component, a polymeric additive, a crosslinking component, and a monomeric curing agent;
   irradiating the polymerizable liquid with light to form the article, the article comprising a polymeric composite material including the polymeric additive and a copolymer comprising the acrylate component and the monomeric curing agent; and
   crosslinking the crosslinking component with the copolymer comprising the acrylate component and the monomeric curing agent,
   wherein the crosslinking component is coated on particles.

14. The method of claim 13, wherein the crosslinking is initiated by a reaction of the monomeric curing agent with the crosslinking component.

15. The method of claim 13, wherein the monomeric curing agent comprises one or more imidazoles.

16. The method of claim 13, wherein the polymerizable liquid is provided in a layer-by-layer process.

17. The method of claim 13, wherein the crosslinking component comprises an epoxy resin, an isocyanate component, a polyol component, or mixtures thereof.

18. The method of claim 13, wherein the article has an impact resistance greater than 1 ft·lb/in. as determined according to ASTM D256.

* * * * *